(12) United States Patent
Hsu

(10) Patent No.: US 8,608,336 B2
(45) Date of Patent: Dec. 17, 2013

(54) MULTIFUNCTION ELECTRICITY GENERATING ASSEMBLY USING SOLAR POWER

(76) Inventor: King-Chi Hsu, Taoyuan County (TW)

( * ) Notice: Subject to any disclaimer, the term of this patent is extended or adjusted under 35 U.S.C. 154(b) by 230 days.

(21) Appl. No.: 13/324,824

(22) Filed: Dec. 13, 2011

(65) Prior Publication Data

US 2012/0155068 A1   Jun. 21, 2012

(30) Foreign Application Priority Data

Dec. 20, 2010  (TW) ................................ 99224631 U
Dec. 20, 2010  (TW) ................................ 99224632 U

(51) Int. Cl.
*F21L 4/08* (2006.01)

(52) U.S. Cl.
USPC ............ 362/183; 362/190; 362/253; 320/101

(58) Field of Classification Search
USPC ......... 362/183, 190, 191, 184, 200, 208, 234, 362/253; 320/101
See application file for complete search history.

(56) References Cited

U.S. PATENT DOCUMENTS

| | | | |
|---|---|---|---|
| 4,486,820 A * | 12/1984 | Baba et al. | 362/183 |
| 5,055,984 A * | 10/1991 | Hung et al. | 362/183 |
| 6,789,917 B2 * | 9/2004 | Parsons et al. | 362/184 |
| 2007/0002561 A1 * | 1/2007 | Tesmer et al. | 362/183 |
| 2008/0106891 A1 * | 5/2008 | Lee | 362/183 |
| 2008/0265834 A1 | 10/2008 | Lin et al. | |
| 2009/0251891 A1 * | 10/2009 | Hong et al. | 362/183 |
| 2009/0284216 A1 * | 11/2009 | Bessa et al. | 320/101 |
| 2010/0317413 A1 * | 12/2010 | Tan | 455/573 |

FOREIGN PATENT DOCUMENTS

TW    M358958 U    6/2009

\* cited by examiner

*Primary Examiner* — Bao Q Truong

(74) *Attorney, Agent, or Firm* — Morrison & Foerster LLP

(57) ABSTRACT

A multifunction electricity generating assembly includes: a pivot seat mounted pivotally in a housing; a solar power collecting unit mounted selectively to the pivot seat, and including a carrier connected detachably to the pivot seat to co-rotate with the pivot seat relative to the housing, and formed with electrical contacts that contact respectively and electrically exposed conductive members of the pivot seat when the carrier is connected to the pivot seat, and a solar power collecting plate connected electrically to the electrical contacts, and carried on the carrier for converting solar power into electrical energy; and a rechargeable battery unit disposed in the housing for storing collecting plate, the electrical energy converted by the solar power collecting plate.

16 Claims, 11 Drawing Sheets

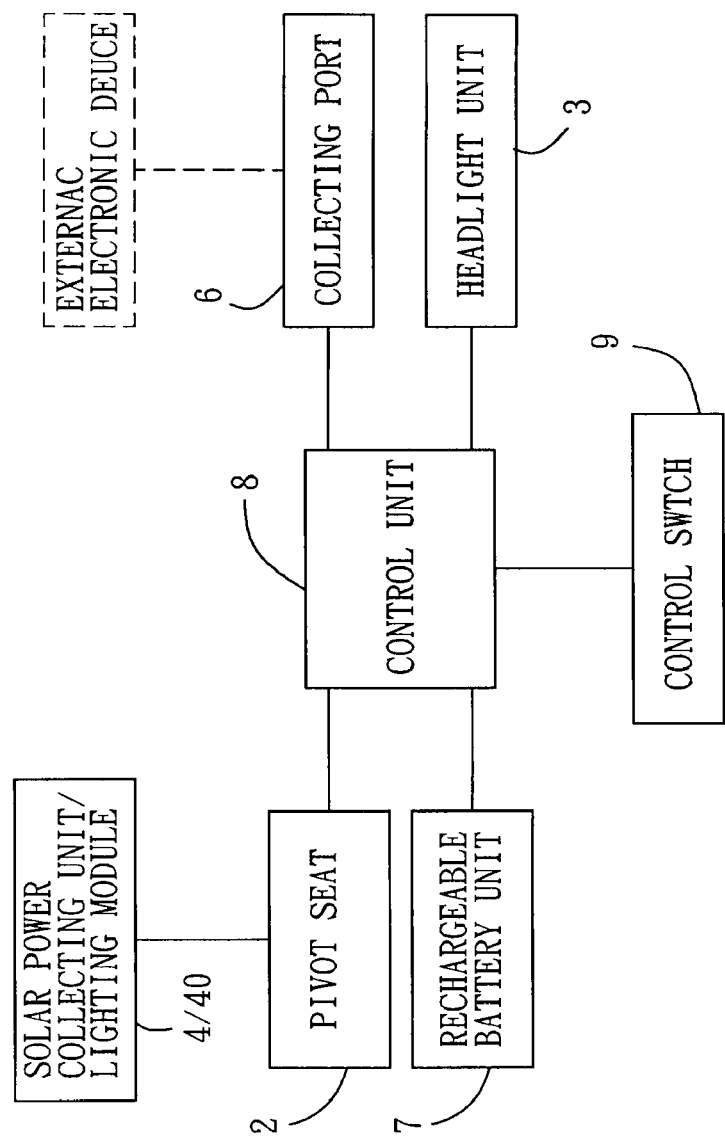
F I G. 3

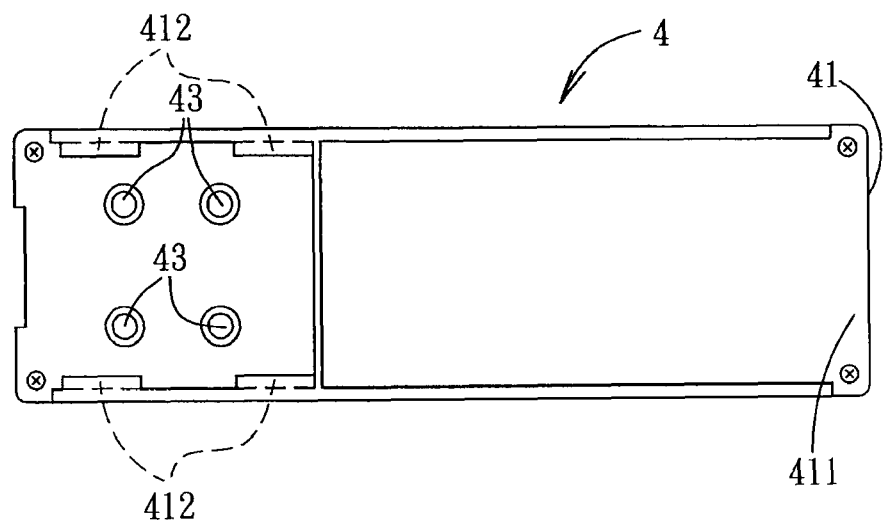
F I G. 4
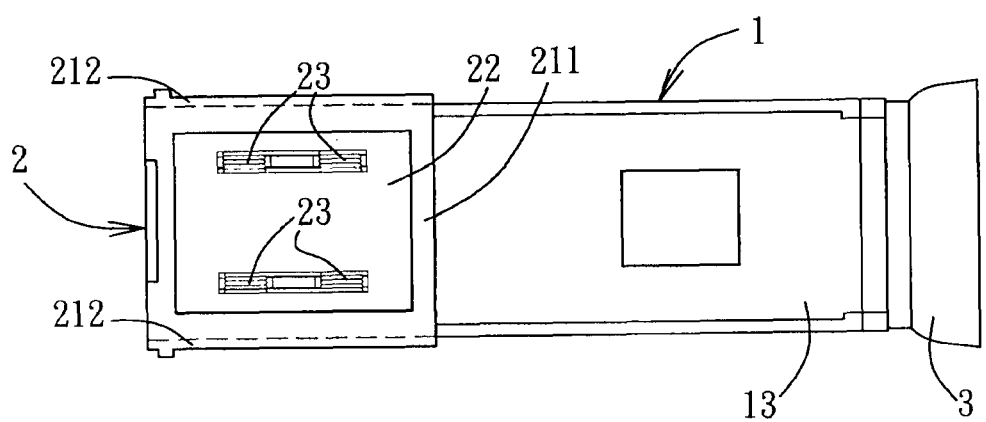
F I G. 5

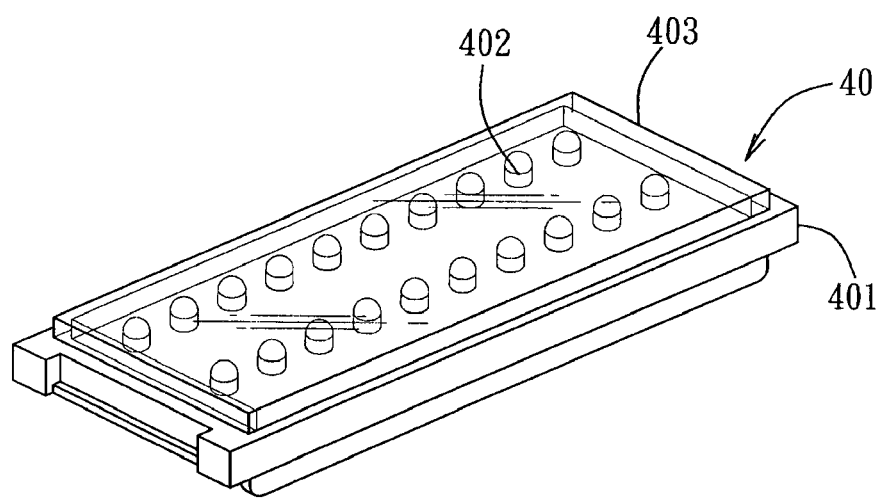
F I G. 9
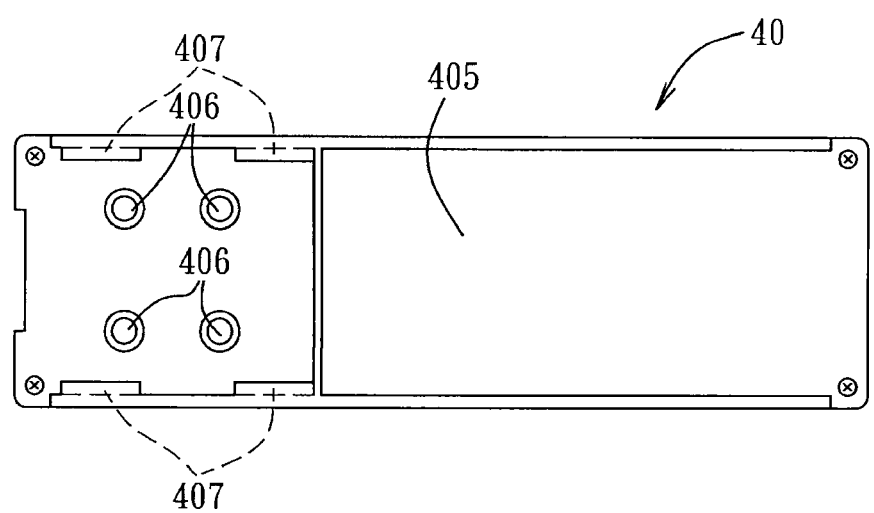
F I G. 10

US 8,608,336 B2

MULTIFUNCTION ELECTRICITY GENERATING ASSEMBLY USING SOLAR POWER

CROSS-REFERENCE TO RELATED APPLICATIONS

This application claims priority to Taiwanese Application Nos. 099224631 and 099224632, both filed Dec. 20, 2010.

BACKGROUND OF THE INVENTION

1. Field of the Invention

This invention relates to an electricity generating device, and more particularly to a multifunction electricity generating assembly.

2. Description of the Related Art

A conventional electricity generating device disclosed in Taiwanese Utility Model No. M358958 includes a housing, a solar power collecting plate mounted fixedly on the housing for converting solar power into electrical energy, a rechargeable battery disposed in the housing for storing the electrical energy converted by the solar power collecting plate, at least one photoelectric device capable of emitting light using electrical power stored in the rechargeable battery, and a USB plug mounted on the housing for connecting an external power source such that the rechargeable battery is charged with electrical power supplied by the external power source.

In such a configuration, because the solar power collecting plate is fixed on the housing, the rechargeable battery may be heated by solar thermal energy during solar power collection by the solar power collecting plate, thereby reducing the service life of the rechargeable battery. Therefore, improvements may be made to the above techniques.

SUMMARY OF THE INVENTION

Therefore, a goal of the present invention is to provide a multifunction electricity generating assembly that can overcome the aforesaid drawbacks of the prior art. According to the present invention, there is provided a multifunction electricity generating assembly using solar power. The multifunction electricity generating assembly includes:

a housing;

a pivot seat mounted pivotally in the housing, and having a top side provided with a plurality of exposed conductive members thereon;

a solar power collecting unit mounted selectively to the pivot seat, and including a carrier connected detachably to the pivot seat such that the carrier is co-rotatable with the pivot seat relative to the housing, and having a bottom side formed with a plurality of first electrical contacts that contact respectively and electrically the conductive members of the pivot seat when the carrier is connected to the pivot seat, and a solar power collecting plate connected electrically to the first electrical contacts, and carried on the carrier for converting solar power into electrical energy; and a rechargeable battery unit disposed in the housing and capable of storing the electrical energy converted by the solar power collecting plate.

BRIEF DESCRIPTION OF THE DRAWINGS

Other features and advantages in accordance with the present invention will become apparent in the following detailed description of one embodiment with reference to the accompanying drawings, of which:

FIG. 3 is a schematic electrical circuit block diagram illustrating the embodiment;

FIG. 4 is a schematic bottom view showing a solar power collecting unit of the embodiment;

FIG. 5 is a schematic top view showing the embodiment when in the first state of use without the solar power collecting unit;

FIG. 9 is a perspective view showing a lighting module of the embodiment;

FIG. 10 is a schematic bottom view of the lighting module;

DETAILED DESCRIPTION

Figure 1:
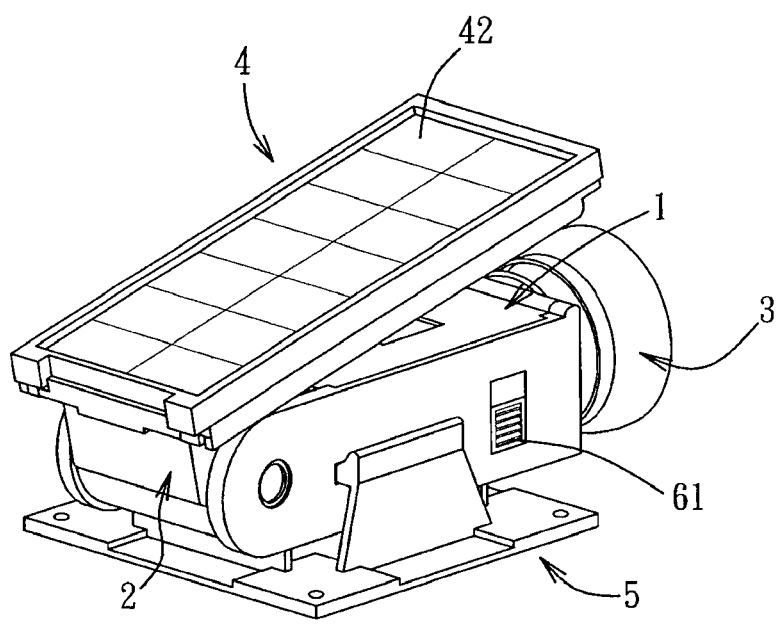
FIG. 1 is an assembled perspective view showing an embodiment of a multifunction electricity generating assembly according to the present invention when in a first state of use.
Figure 2:
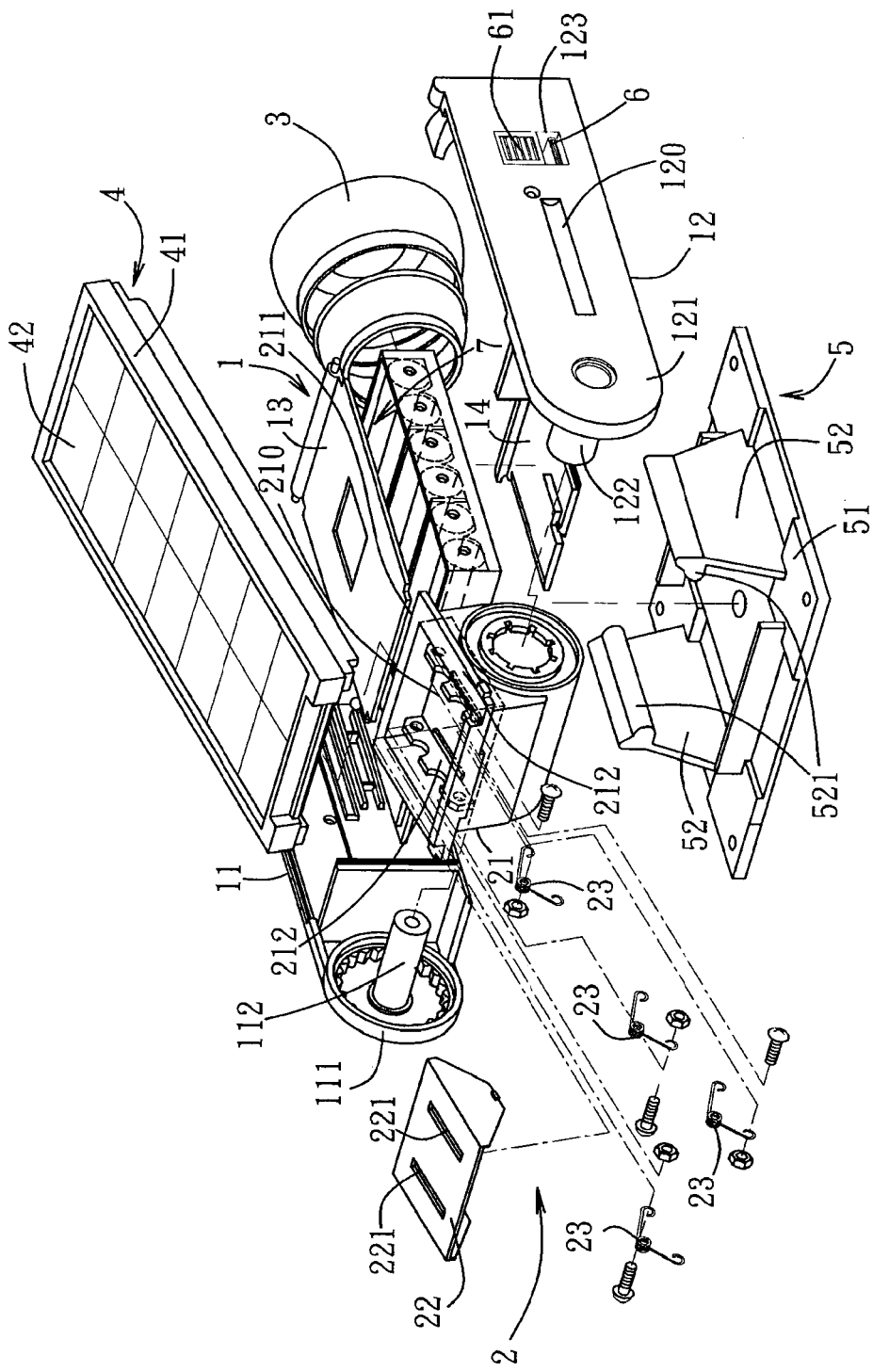
FIG. 2 is a partly exploded perspective view showing the embodiment when in the first state of use.

Referring to FIGS. 1 to 3, an embodiment of a multifunction electricity generating assembly according to the present invention is shown to include a supporting frame 5, a housing 1, a pivot seat 2, a solar power collecting unit 4, a lighting module 40, a rechargeable battery unit 7, a control unit 8, a headlight unit 3, a connecting port 6, and a control switch 9.

Figure 7:
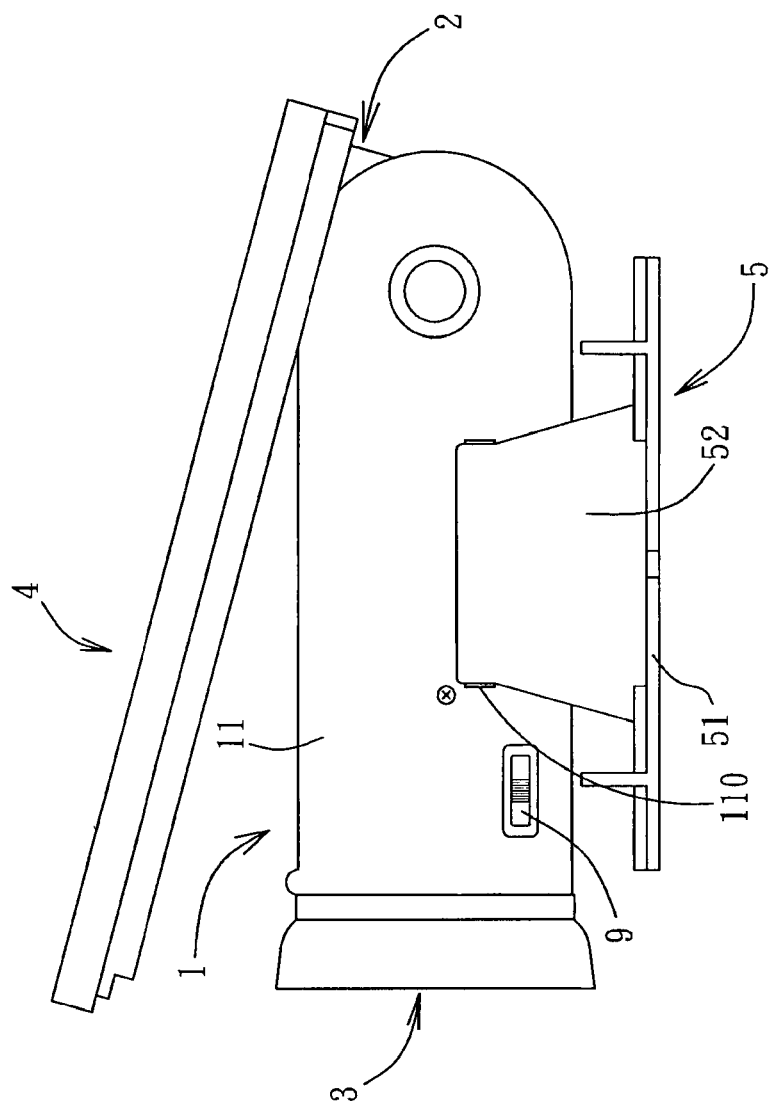
FIG. 7 is another schematic side view showing the embodiment when in the first state of use.

In this embodiment, the housing 1 consists of first and second housing parts 11, 12 opposite to each other, and third and fourth housing parts 13, 14. The first housing part 11 has an outer surface formed with an engaging groove 110 (see FIG. 7), and an axial rod 12 extending inward from one end 111 thereof toward the second housing part 12. The second housing part 12 has an outer surface formed with an engaging groove 120, and an axial sleeve 122 extending inward from one end 121 thereof toward the first housing part 11 and permitting extension of the pivot rod 111 of the first housing part 11 thereinto.

The supporting frame 5 is used to support the housing 1, and includes a base plate 51, and opposite clamp arms 52 extending upward from the base plate 51 for clamping the housing 1 therebetween. In this embodiment, each clamp arm 52 has an upper end formed with an engaging protrusion 521 that protrudes toward the other clamp arm 52 and that engages releasably a corresponding one of the engaging grooves 110, 120 in the first and second housing parts 11, 12.

The pivot seat 2 is mounted pivotally in the housing 1. In this embodiment, the pivot seat 2 permits extension of an assembly of the axial rod 112 and the axial sleeve 122 therethrough such that the pivot seat 2 is rotatable relative to the housing 1 about the assembly of the axial rod 112 and the axial sleeve 122. The pivot seat 2 has a top side provided with a plurality of exposed conductive members 23 thereon. In this embodiment, the pivot seat 2 consists of a hollow main seat body 21 and a cover plate 22. The main seat body 21 permits extension of the assembly of the axial rod 112 and the axial sleeve 122 therethrough, and is configured with an inner space 210 for receiving the conductive members 23 therein, and has an upper open end 211. The cover plate 22 is mounted fittingly on the upper open end 211 to close the inner space 210 in the main seat body 21 such that the upper open end 211 cooperates with the cover plate 22 to form the top side of the pivot seat 2. The cover plate 22 is formed with a plurality of through holes 221 permitting extension of the conductive members 23 therethrough. In addition, each conductive member 23 is a metal torsion spring. Furthermore, the upper open end 211 of the main seat body 21 has opposite engaging extensions 212, as best shown in FIG. 5.

Figure 12:
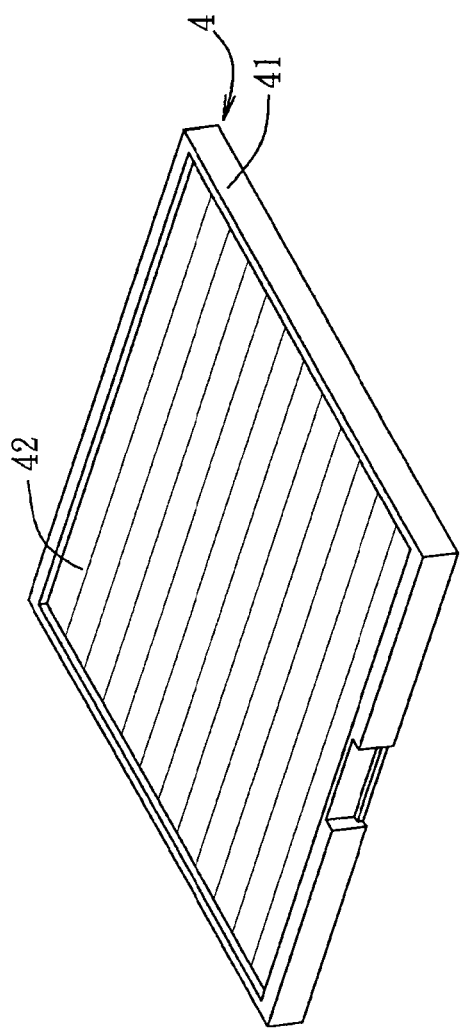
FIG. 12 is a perspective view showing a variation of the solar power collecting unit of the embodiment.
Figure 13:
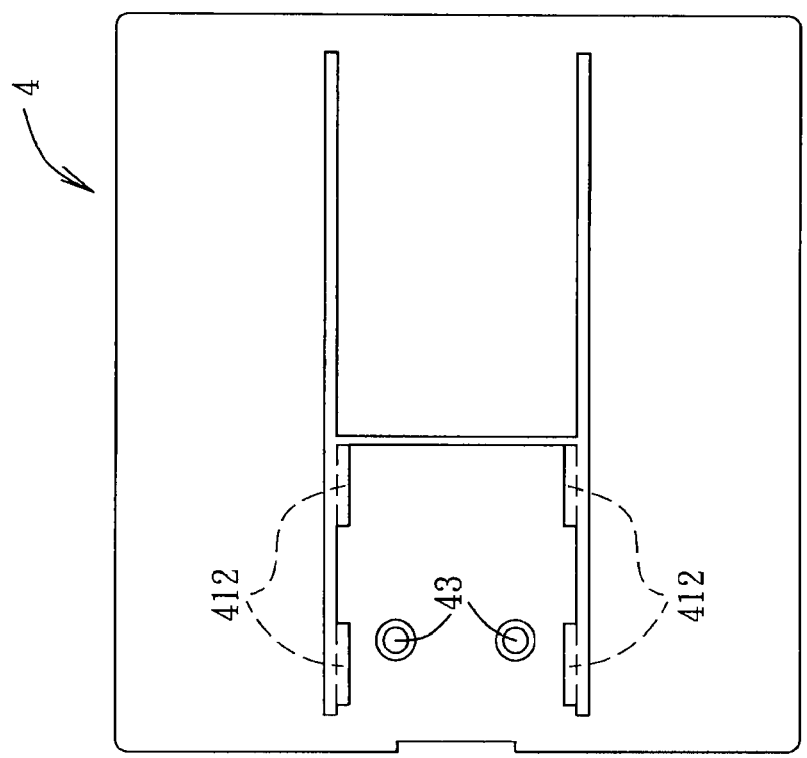
FIG. 13 is a schematic bottom view showing the variation of the solar power collecting of the embodiment.

When the multifunction electricity generating assembly is operated in a first state of use, the solar power collecting unit 4 is mounted selectively to the pivot seat 2. The solar power collecting unit 4 includes a carrier 41 and a solar power collecting plate 42. The carrier 41 is connected detachably to the pivot seat 2 such that the carrier 41 is co-rotatable with the pivot seat 2 relative to the housing 1. Referring further to FIG. 4, the carrier 41 has a bottom side 411 formed with a plurality of first electrical contacts 43 that contact respectively and electrically the conductive members 23 of the pivot seat 2 when the carrier 41 is connected to the pivot seat 2. In this embodiment, the bottom side 411 of the carrier 4 is formed with opposite slide tracks 412. Each engaging extension 212 of the pivot seat 2 engages slidably and releasably a corresponding slide track 412, thereby connecting the carrier 41 with the pivot seat 2. The solar power collecting plate 42 is connected electrically to the first electrical contacts 43, and is carried on the carrier 41 for converting solar power into electrical energy. In this embodiment, the electrical energy is of 5.5V and 3.5 W. Alternatively, the solar power collecting plate 42 can have a larger size as required for more electrical energy, as shown in FIGS. 12 and 13. It is noted that the solar power collecting unit 4 is rotatable so that the solar power collecting plate 42 is moved to face sunlight, thereby increasing a solar power collecting efficiency.

The rechargeable battery unit 7 is disposed in the housing 1, and is capable of storing the electrical energy converted by the solar collecting plate 42. In this embodiment, the rechargeable battery unit 7 includes six Ni-MH batteries of 1.2V. It is noted that, when the solar power collecting unit 4 is mounted to the pivot seat 2, the carrier 41 is disposed movably above the housing 1 for shielding the rechargeable battery unit 7 from sunlight, thereby prolonging the service life of the rechargeable battery unit 7.

The control unit 8 is connected electrically to the conductive members 23 of the pivot seat 2 and the rechargeable battery unit 7. The control unit 8 is operable to charge the rechargeable battery unit 7 with the electrical energy converted by the solar power collecting plate 42, and to supply electrical power stored in the rechargeable battery unit 7 or the electrical energy converted by the solar power collecting plate 42.

The headlight unit 3 is mounted on the housing 1, and is disposed opposite to the pivot seat 2. The headlight unit 3 is connected electrically to the control unit such that the headlight unit 3 is lighted through control of the control unit 8.

Figure 6:
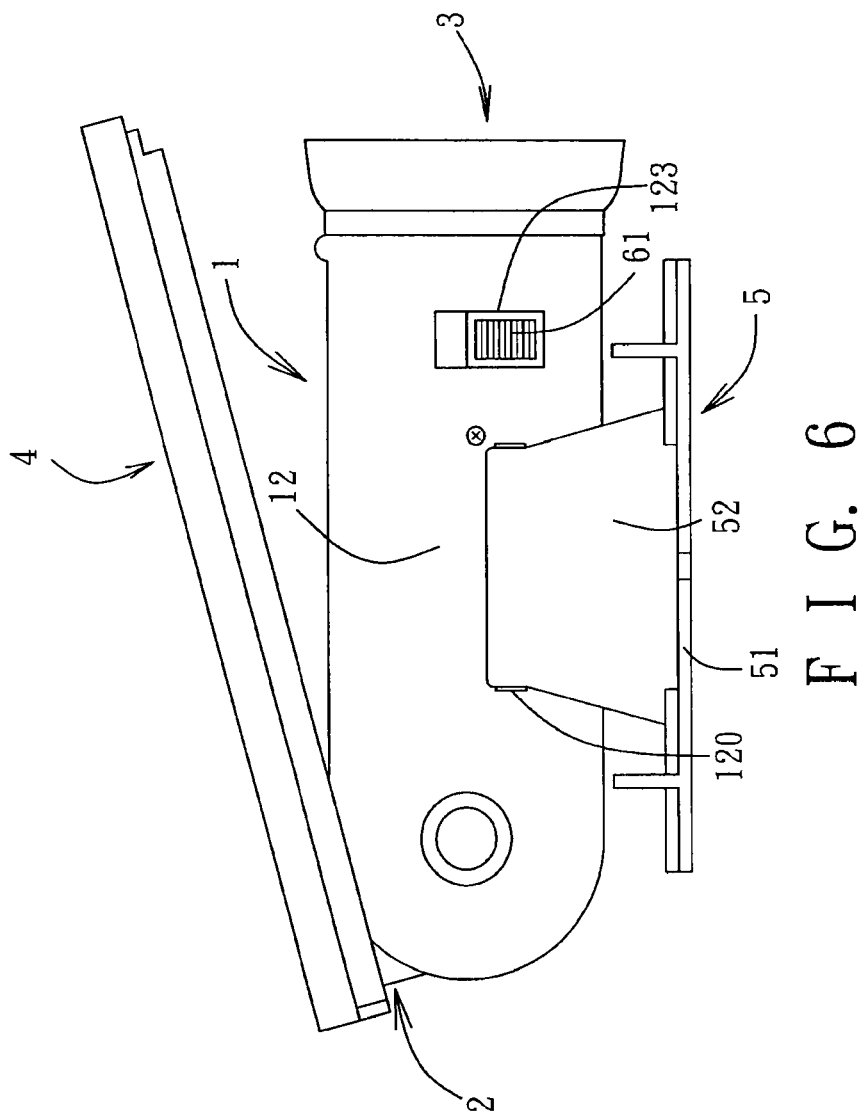
FIG. 6 is a schematic side view showing the embodiment when in the first state of use.

The connecting port 6 is mounted in the housing 1 and is exposed through an opening 123 in the second housing part 12. In this embodiment, the connecting port 6 is a USB port that is adapted to be connected electrically to an external electronic device. In addition, a slide cover 61 is mounted slidably in the opening 123 for closing the opening 123 when the connecting port 6 is not used (see FIG. 6), thereby protecting the connecting port 6.

The control switch 9 is mounted on the first housing part 11 of the housing 1 (see FIG. 7), and is connected electrically to the control unit 8. The control switch 9 is operable to generate a control signal such that the control unit controls the headlight unit 3 to operate in a desired lighting mode based on the control signal from the control switch 9. In this embodiment, the control switch 9 is a five-stage switch, for example a flash-stage, an illumination-stage, an off-stage, an automatic-stage and a manual-stage, but is not limited thereto. When the control switch 9 is switched to flash-stage, the control unit 8 controls the headlight unit 3 to flash based on the control signal from control switch 9. When the control switch 9 is switched to the illumination-stage, the control unit 8 controls the headlight unit 3 to light based on the control signal from the control switch 9. When the control switch 9 is switched to the off-stage, the control unit 8 turns off the headlight unit 3. When the control switch 9 is switched from the off-stage to the automatic-stage, based on the control signal from the control switch 9, the control unit 8 detects the amount of electricity remaining in the rechargeable battery unit 7, and controls the heading unit 3 to flash so as to indicate the amount of electricity remaining in the rechargeable battery unit 7 and to then illuminate for a predetermined time period. When the control switch 9 is switched to the manual-stage, the control unit 8 supplies the electrical power from the rechargeable battery unit 7 to the external electronic device through the connecting port 6.

Figure 8:
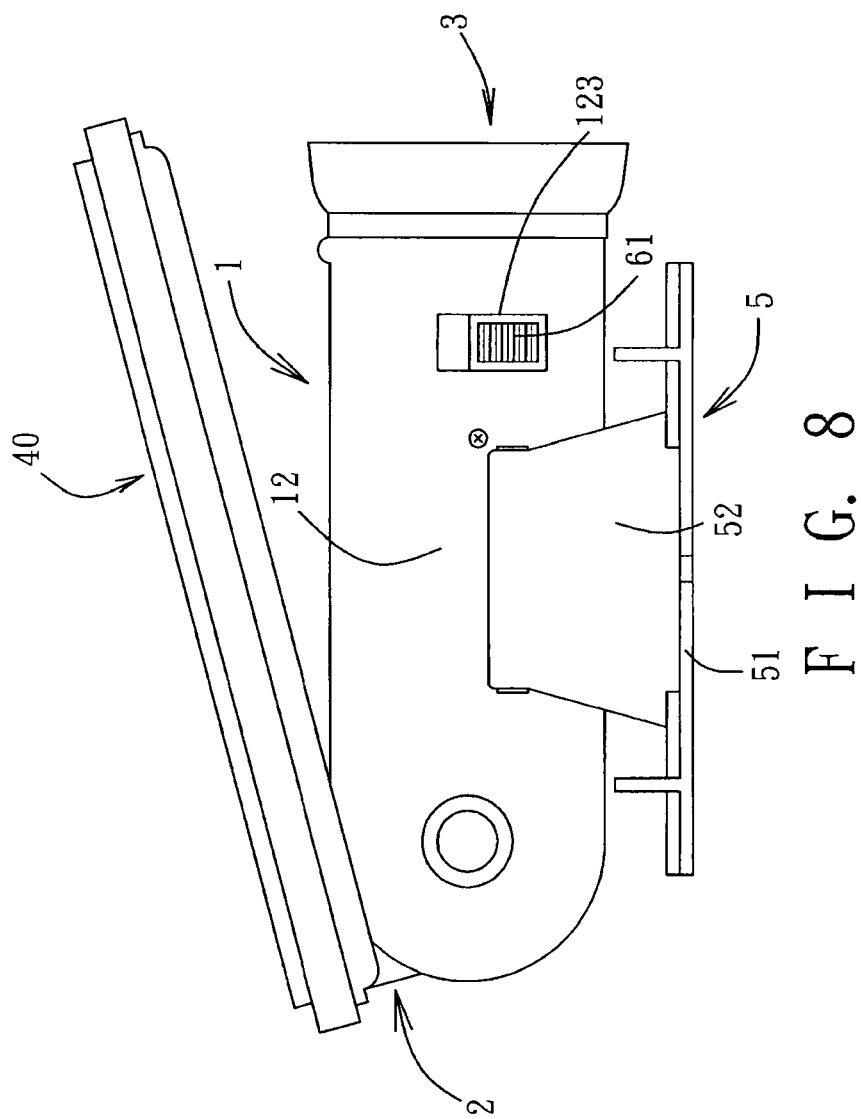
FIG. 8 is a schematic side view showing the embodiment when in a second state of use.

Referring further to FIG. 8, when the multifunction electricity generating assembly is operated in a second state of use, the lighting module 40 is mounted selectively to the pivot seat 2. As shown in FIG. 9, the lighting module 40 includes a lamp-mounting seat 401, a light emitting diode (LED) unit 402, and a transparent cover 403.

The lamp-mounting seat 401 is connected detachably to the pivot seat 2 such that the lamp-mounting seat 401 is co-rotatable with the pivot seat 2 relative to the housing 1. The lamp-mounting seat 401 has a bottom side 405 formed with a plurality of second electrical contacts 406 that contact respectively and electrically the conductive members of the pivot seat 2 when the lamp-mounting seat 401 is connected to the pivot seat 2. In this embodiment, the lamp-mounting seat 401 has the same size as that of the carrier 41 of the solar power collecting unit 4. Similar to the carrier 41 of the solar collecting unit 4, the bottom side 405 is formed with opposite slide tracks 407 engaging releasably and respectively the engaging extensions 212 of the pivot seat 2, thereby connecting the lamp-mounting seat 301 with the pivot seat 2.

The LED unit 402, which consists of a plurality of LEDs, is mounted in the lamp-mounting seat 401, and is coupled to the second electrical contacts 406. When the lamp-mounting seat 401 is connected to the picot seat 2, the control unit 8 supplies the electrical power stored in the rechargeable battery unit 7 to the LED unit 402.

The transparent cover 403 is mounted on the lamp-mounting seat 401 for covering the LED unit 402.

Figure 11:
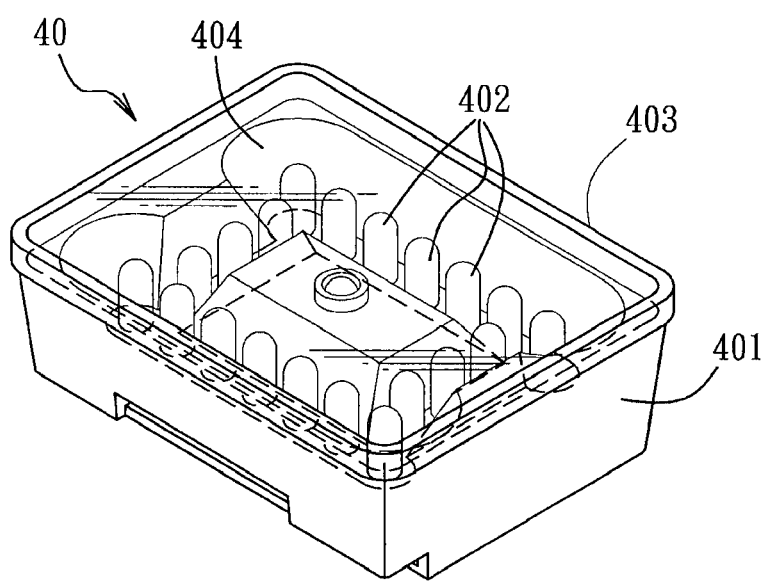
FIG. 11 is a perspective view of a variation of the lighting module.

FIG. 11 shows a variation of the lighting module 40, wherein the lighting module 40 further includes a reflector 404 mounted in the lamp-mounting seat 401 and surrounding the LED unit 402.

In sum, the solar power collecting unit 4 or the lighting module 40 can be selectively connected to the pivot seat 2 such that the control unit 8 charges the rechargeable battery unit 7 or supplies the electrical power stored in the rechargeable battery unit 7. In addition, when the multifunction electricity generating assembly is operated in the second state of use, the carrier 41 of the solar power collecting unit 4 is disposed above the housing 1 so as to shield the rechargeable battery unit 7 from sunlight, thereby prolonging the service life of the rechargeable battery unit 7.

While the present invention has been described in connection with what is considered the most practical and useful embodiment, it is understood that this invention is not limited to the disclosed embodiment but is intended to cover various arrangements included within the spirit and scope of the broadest interpretation of the appended claims so as to encompass all such modifications and equivalent arrangements.

What is claimed is:

1. A multifunction electricity generating assembly using solar power, comprising:
    a housing
    a pivot seat mounted pivotally in said housing, and having a top side provided with a plurality of exposed conductive members thereon;
    a solar power collecting unit mounted selectively to said pivot seat, and including:
        a carrier connected detachably to said pivot seat such that said carrier is co-rotatable with said pivot seat relative to said housing, and having a bottom side formed with a plurality of first electrical contacts that contact respectively and electrically said conductive members of said pivot seat when said carrier is connected to said pivot seat, and
        a solar power collecting plate connected electrically to said first electrical contacts, and carried on said carrier for converting solar power into electrical energy; and
    a rechargeable battery unit disposed in said housing and capable of storing the electrical energy converted by said solar power collecting plate.

2. The multifunction electricity generating assembly of claim 1 wherein:
    said bottom side of said carrier of said solar power collecting unit is formed with opposite slide tracks; and
    said top side of said pivot seat has opposite engaging extensions, each of said engaging extensions engaging slidably and releasably a corresponding one of said slide tracks of said carrier of said solar power collecting unit, thereby connecting said carrier of said solar power collecting unit with said pivot seat.

3. The multifunction electricity generating assembly of claim 1, wherein said top side of said pivot seat defines a plurality of through holes permitting extension of said conductive members therethrough.

4. The multifunction electricity generating assembly of claim 1, wherein said carrier of said solar power collecting unit is disposed movably above said housing for shielding said rechargeable battery unit from sunlight.

5. The multifunction electricity generating assembly of claim 1, further comprising a control unit connected electrically to said conductive members of said pivot seat and said rechargeable battery unit, said control unit being operable to charge said rechargeable battery unit with the electrical energy converted by said solar power collecting plate, and to supply electrical power stored in said rechargeable battery unit or the electrical energy converted by said solar power collecting plate.

6. The multifunction electricity generating assembly of claim 5, further comprising a lighting module mounted selectively to said pivot seat, and including:
    a lamp-mounting seat connected detachably to said pivot seat such that said lamp-mounting seat is co-rotatable with said pivot seat relative to said housing, and having a bottom side formed with a plurality of second electrical contacts that contact respectively and electrically said conductive members of said pivot seat when said lamp-mounting seat is connected to said pivot seat, and
    a light emitting diode unit mounted in said lamp-mounting seat and coupled to said second electrical contacts;
    wherein, when said solar power collecting unit is detached from said pivot seat while said lamp-mounting seat of said lighting module is connected to said pivot seat, said control unit supplies the electrical power stored in said rechargeable battery unit to said light emitting diode unit of said lighting module.

7. The multifunction electricity generating assembly of claim 6, wherein:
    said bottom side of said lamp-mounting seat of said lighting module has opposite slide tracks; and
    said top side of said pivot seat has opposite engaging extensions extending outward and respectively from opposite lateral sides thereof, each of said engaging extensions engaging slidably and releasably a corresponding one of said slide tracks of said carrier of said solar power collecting unit, thereby connecting said lamp-mounting seat of said lighting module with said pivot seat.

8. The multifunction electricity generating assembly of claim 6, wherein said lighting module further includes a transparent cover mounted on said lamp-mounting seat for covering said light emitting diode unit.

9. The multifunction electricity generating assembly of claim 6, wherein said lighting module a reflector mounted in said lamp-mounting seat and surrounding said light emitting diode unit.

10. The multifunction electricity generating assembly of claim 5, further comprising a headlight unit mounted on said housing, disposed opposite to said pivot seat and connected electrically to said control unit such that said headlight unit is lighted through control of said control unit.

11. The multifunction electricity generating assembly of claim 10, further comprising a control switch mounted on said housing and connected electrically to said control unit, said control switch being operable to generate a control signal such that said control unit controls said headlight unit to operate in a desired lighting mode responsive to the control signal from said control switch.

12. The multifunction electricity generating assembly of claim 5, further comprising a connecting port mounted in said housing, connected electrically to said control unit, and adapted to be coupled to an external electronic device.

13. The multifunction electricity generating assembly of claim 12, wherein said connecting port is a USB port.

14. The multifunction electricity generating assembly of claim 1, further comprising a supporting frame for supporting said housing.

15. The multifunction electricity generating assembly of claim 14, wherein said supporting frame includes a base plate, and opposite clamp arms extending upward from said base plate for clamping said housing therebetween.

16. The multifunction electricity generating assembly of claim 15, wherein:
    said housing has opposite engaging groves; and
    each of said clamp arms has an upper end having an engaging protrusion that protrudes toward the other one of said clamp arms and that engages releasably a corresponding one of said engaging groves.

* * * * *